April 1, 1924. 1,488,537

W. C. FURZE

MOTOR CYCLE SPRING

Filed July 19, 1922

Inventor
William C. Furze

By Horace C. [Attorney signature]

Attorney

Patented Apr. 1, 1924.

1,488,537

UNITED STATES PATENT OFFICE.

WILLIAM CLARENCE FURZE, OF JOHANNESBURG, TRANSVAAL, SOUTH AFRICA.

MOTOR-CYCLE SPRING.

Application filed July 19, 1922. Serial No. 576,170.

*To all whom it may concern:*

Be it known that I, WILLIAM C. FURZE, a citizen of South African Union, residing at Johannesburg, State of Transvaal, South Africa, have invented certain new and useful Improvements in Motor-Cycle Springs; and I do hereby declare the following to be a full, clear, and exact description of the invention, such as will enable others skilled in the art to which it appertains to make and use the same.

This invention relates to new and useful improvements in motorcycle springs and particularly springs used at the rear ends of a motorcycle.

One object of the invention is to provide a device of this character which obviates the usual practice of mounting several heavy laminated leaf springs which add materially to the weight of the motorcycle.

Another object is to provide a device of this character for use in connection with a motorcycle wherein the movement is free and wherein the shocks are properly absorbed.

Other objects and advantages will be apparent from the following description when taken in connection with the accompanying drawing.

Figure 1:
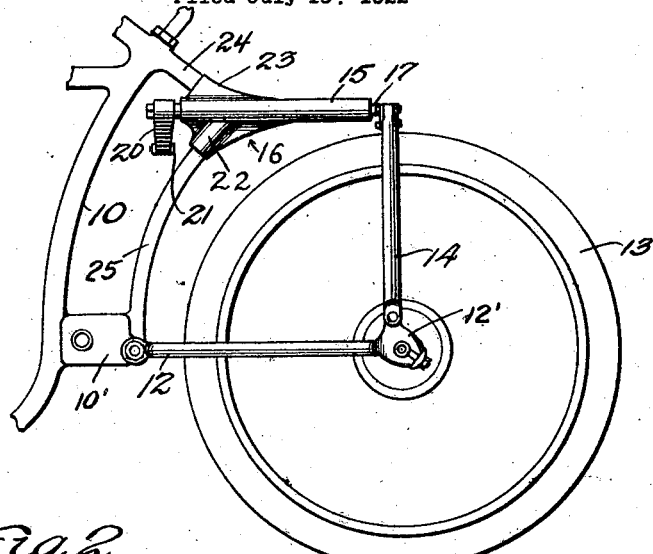
Figure 1 is a side elevation of the rear portion of a motorcycle showing the invention.
Figure 2:
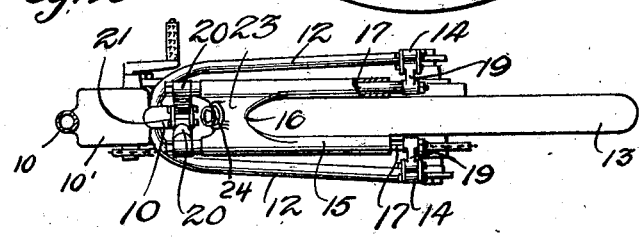
Figure 2 is a top plan view of the same, the saddle being removed.
Figure 3:
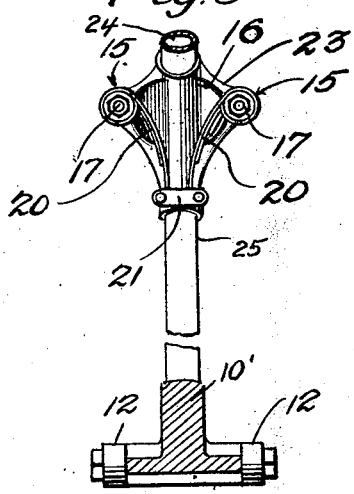
Figure 3 is a front elevation.
Figure 4:
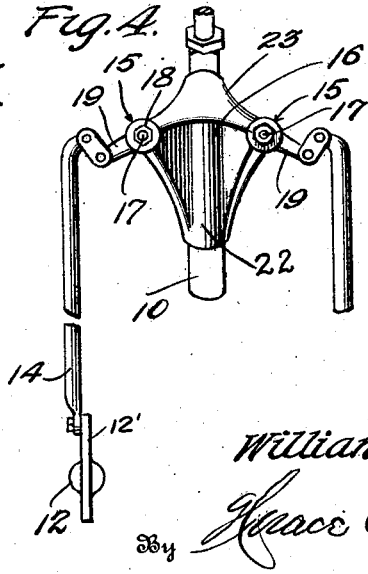
Figure 4 is a rear elevation.

Referring particularly to the accompanying drawing 10 represents the saddle post bar of the motorcycle frame which carries the saddle on its upper end and to the lower end portion of which is secured the rearwardly extending member 10'. Pivotally connected to the member 10' are the rearwardly horizontal bars 12, the axle of the rear wheel 13 being mounted in the rear ends of these bars as shown at 12'. Extending vertically from, and pivotally connected with the rear ends of the bars 12, are the bars 14 of which mention will be made later. Extending downwardly and rearwardly from the upper portion of the bar 10, is an extension 24. Connected with the member 10', and extending upwardly in parallel relation to the bar 10, is a bar 25.

Disposed over the rear wheel 13 is a horizontal and rearwardly extending member 16, which has the tubular socket portions 22 and 23, the former of which receives the upper end of the bar 25, while the latter receives the said extension 24. At opposite sides of the member 26 are formed the longitudinal parallel tubular portions 15, and rockably supported in each of said portions 15 is a shaft 17. The rear end of each of the shafts 17 terminates adjacent to and inwardly of the upper end of a bar 14, while the forward ends project a slight distance beyond the forward end of the member 15. The rear end of the shaft 17 is polygonal as indicated at 18, and engaged thereon is a laterally extending arm 19, which is pivotally connected with the upper end of a bar 14.

Keyed on the forward end of the shaft 17 is a downwardly and laterally curved leaf spring 20. There are two of these springs 20, one on each side of the shaft 17, the lower ends of said springs being pivotally connected together as shown at 21.

When the rear wheel 13 strikes an obstacle, the tendency is for the wheel to rise and in so doing it swings upwardly the bars 12 and the bars 14, with the result that the bars 14 rock the shaft 17 through the medium of the arms 19. This rocking of the shafts 17 moves the springs 20 toward each other so that they will be flexed and absorb the shock.

What is claimed is.

1. The combination with the rear portion of the frame of a motorcycle having a movable portion, of longitudinal supports, rock shafts in the supports, spring means carried by one end of the rock shafts at one end and being connected together, and connections between the movable portion of the frame and the other ends of the rock shafts for rocking said shafts and flexing said springs.

2. The combination with a motorcycle frame which includes the saddle post bar having an extension, the horizontal rear wheel fork and vertical bars supported on said fork, of horizontal longitudinal tubular supports mounted on said extension of the saddle post bar, rock shafts supported in the tubular supports, leaf springs carried by the forward ends of the rock shaft and being movably connected together, and pivotal connections between the rear ends of the rock shaft and said vertical bars and pivotal connections between the rear wheel fork and saddle post bar.

3. A motorcycle shock absorber including a saddle post bar having an extension, a rear wheel fork pivotally connected to the saddle post bar, vertical bars carried by the rear ends of the fork, longitudinally extending tubular members secured to the extension of the saddle post bar, rock shafts in the tubular members, braces extending from the saddle post bar to the tubular members, downwardly and laterally curved leaf springs secured to the forward ends of the rock shaft and pivotally connected at their lower ends, and radial arms carried by the rear ends of the rock shaft and pivotally connected to the upper ends of the vertical bars.

In testimony whereof, I affix my signature, in the presence of two witnesses:

WILLIAM CLARENCE FURZE.

Witnesses:
 WM. DUNBAR,
 I. SAMSON.